June 9, 1964 A. M. BINKIS 3,136,955
AUTOMATIC FREQUENCY CONTROL FOR A TRANSISTOR TELEVISION RECEIVER
Filed Dec. 1, 1961
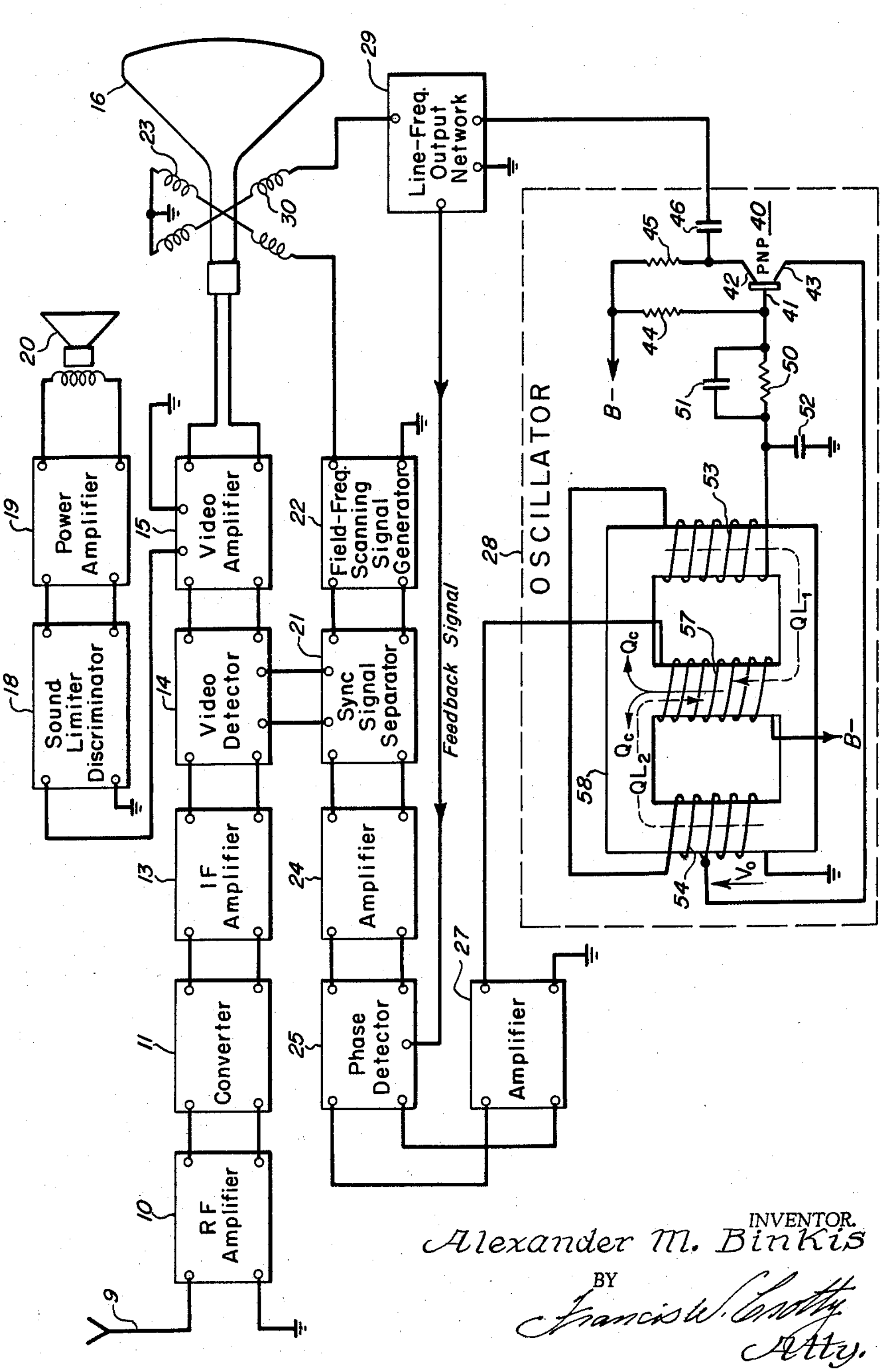
INVENTOR.
Alexander M. Binkis
BY Francis W. Crotty
Atty.

United States Patent Office 3,136,955

Patented June 9, 1964

3,136,955
AUTOMATIC FREQUENCY CONTROL FOR A TRANSISTOR TELEVISION RECEIVER

Alexander M. Binkis, Westchester, Ill., assignor to Zenith Radio Corporation, a corporation of Delaware Filed Dec. 1, 1961, Ser. No. 156,212
1 Claim. (Cl. 331—8)

This invention relates to wave signal translating apparatus and more particularly to automatic frequency control circuitry which may be employed to control the line frequency oscillator of a television receiver.

In conventional television receivers, it is of prime importance to keep certain signal generating components in phase with corresponding components of a television transmitting station which radiates a signal having sound, video, and synchronizing components. The synchronizing components are customarily employed to keep the line frequency and field frequency generators of the receiver in synchronism with the transmitting equipment. To this end, it is customary to compare the transmitted synchronizing information with locally generated signals to produce an error signal indicative of their phase relation. The error signal is applied to a variable reactance device which changes the frequency of the generator output signal in order to establish and maintain a preselected phase relation. In conventional tube-type television circuitry, reactance or control tubes respond to the error signal to control phase but they are not practical for use in transistor-type television receivers.

In lieu of the reactance tube, the art sometimes employs voltage sensitive variable capacitors particularly in adjusting the local oscillator of frequency-modulation radio receivers. These devices have proved to be satisfactory in such receivers because the operating frequency is in the megacycle range wherein a small change in capacitance provides a rather substantial change in reactance. However, the horizontal oscillator of a television receiver operates at approximately 15 kilocycles, and the capacitance variation obtainable at this frequency with currently available voltage-sensitive capacitive devices is insufficient.

Another solution to the problem of automatic frequency or phase control has been the use of variable inductors of the saturable reactor type similar to those used in motor controls. By applying a direct current control or error signal to a control winding of the reactor, the permeability of the core may be varied effectively changing its reactance. Of necessity, devices of this nature are of the multi-winding type, and the output or principal winding has a lesser number of turns than the control winding because of the desirability to effect variations in permeability with as little control current as possible. Considering only the turns ratio of the device, the control winding to output winding ratio is analogous to that of a voltage step-down transformer.

In employing a device of this type, the output winding usually forms part of the frequency determining circuit of the oscillator and as a result, a signal of the local oscillator frequency of relatively large magnitude is induced in the control winding. This signal may be of sufficient magnitude to damage the circuit wherein the control signal is developed especially if that circuit is of the transistor variety.

It is, therefore, an object of this invention to provide a frequency or phase control arrangement which overcomes deficiencies and disadvantages of prior automatic frequency control circuits.

It is a further object of this invention to provide a new and improved inductive reactance device for controlling a local oscillator of a television receiver.

It is still another object of this invention to provide a frequency control arrangement of the variable inductance type for the horizontal oscillator of a transistorized television receiver which eliminates the danger of high voltage breakdown in the driving stage which supplies the error signal to the control arrangement.

In accordance with the invention, an automatic frequency control circuit, such as that which may be employed in conjunction with the horizontal oscillator of a transistor television receiver, comprises a source of reference signal and a transistor generator for producing a local signal the phase of which may be varied. In addition, the control circuit comprises means for comparing the phase of the reference signal and the local signal to produce an error signal varying in both directions from a reference value in proportion to the magnitude and direction of departure of the local signal from a predetermined phase relation with the reference signal. The circuit further comprises a transistor error-signal translating stage coupled to the phase comparing means and subject to breakdown in the presence of high-voltage feedback signals from subsequent stages and a variable inductive reactance, included in the generator for varying the frequency of the local signal bi-directionally about a predetermined frequency, comprising a permeable core having a center leg and two end legs with a control winding wound about the center leg and a principal two-section winding with one of the sections wound about each of the end legs to induce equal and opposite feedback voltages in the control winding. Additionally, there are means coupled to the transistor error-signal translating stage for applying the error signal to the control winding to bi-directionally vary the saturation of the core and the apparent inductance of the inductive reactance to maintain the local signal at the predetermined frequency while preventing the application of high-voltage feedback signals and consequent damage to the error-signal translating stage.

The features of this invention which are believed to be novel are set forth with particularity in the appended claims. The invention, together with further objects and advantages thereof, may best be understood, however, by reference to the following description taken in conjunction with the accompanying drawing, in the single figure of which is a schematic diagram of a television receiver embodying the automatic frequency control apparatus of the invention.

The receiver, as shown, comprises a receiving antenna 9 coupled to a radio-frequency amplifier 10 of one or more stages which includes means for selecting one of the transmitted signals. The selected signal is coupled from amplifier 10 to a converter 11 which provides an intermediate-frequency signal. The output of the converter is translated to an intermediate-frequency amplifier 13 of one or more stages and a video detector 14 is coupled thereto to receive the amplified intermediate-frequency signal. Coupled to the output of video detector 14 is a video amplifier 15 which translates the amplified detected video components to a cathode-ray tube or other image reproducing device 16. An intercarrier-sound signal component also derived by detector 14 and amplified by video amplifier 15 is translated to a limiter-discriminator 18 which is coupled between amplifier 15 and a power amplifier 19. A speaker 20 is coupled to the output of power amplifier 19 in conventional fashion.

Video detector 14 is also provided with an output for translating detected field and line synchronizing signal components also present in the intermediate-frequency signal. A synchronizing-signal-separator 21 is coupled to this output and provides information for synchronizing the scanning apparatus associated with image reproducing device 16. A field-frequency scanning signal generator 22 is coupled to one output of sync-signal-separator 21 and has a conventional field frequency scanning coil 23 coupled to its output terminals. A line frequency signal translating network comprising the series arrangement of an amplifier 24, a phase detector 25, a control signal amplifier 27, and an oscillator 28 are coupled between signal-separator 21 and a line frequency output network 29. Oscillator 28 produces a local signal which is variable in phase by frequency adjustment of the oscillator in accordance with the subject invention as described more particularly hereafter. A conventional line freqnency deflection coil 30 is coupled to line frequency output network 29. In addition, line frequency output network 29 provides a feedback signal to phase detector 25. If desired automatic gain control of the radio-frequency and intermediate-frequency stages may be provided.

The described receiver, except for its automatic frequency or phase control arrangement, to be considered more particularly hereafter, is conventional. Incoming composite television signals intercepted by antenna 9 are applied to and amplified by radio-frequency amplifier 10. The selected signal is applied to converter 11 which heterodynes it with locally generated oscillations to develop an intermediate-frequency which is amplified by amplifier 13. This amplified signal is applied to video detector 14 which derives the synchronizing, video and sound components. The video and sound components are translated to video amplifier 15 which provides amplified video components for use by image reproducer 16. The sound components in the form of a frequency-modulated intercarrier signal are supplied to limiter and discriminator 18, wherein the audio components are derived and after amplification by power amplifier 19 they drive speaker 20 which reproduces the audio portion of the telecast.

The synchronizing signal components supplied by detector 14 are separated into field and line components, the field frequency components being translated to generator 22 which provides a deflection signal for the field or vertical yoke 23. The horizontal synchronizing output of signal separator 21 serves as a source of reference signal which is applied through amplifier 24 to phase detector 25. This detector comprises means for comparing the phase of the reference signal and the local signal of horizontal frequency generator 28 to produce an error signal indicative of their phase relation. The locally generated horizontal signal is delivered to the phase detector through the feedback connection from line frequency output network 29. The error signal developed in the phase detector is applied to control signal amplifier 27 and, after amplification, it is employed to control the operating frequency of line-frequency generator 28. The output of generator 28 is supplied to network 29 which supplies a deflection signal to horizontal yoke 30.

More particular consideration will now be given to the automatic frequency control arrangement including the sine-wave oscillation generator 28, which is of the Hartley type and comprises a transistor 40 of the PNP type having a base 41, collector 42 and emitter 43. The collector is coupled through a load resistor 45 to a suitable source of negative potential —B so that it is reversed biased. Collector 42 is also coupled to line frequency output network 29 by way of a capacitor 46. A voltage divider arrangement comprising series-connected resistors 44 and 50 is coupled between —B and ground and provides a forward bias voltage for base electrode 41 which is coupled to the junction of these resistors. The bias potentials are such that the oscillator operates in the class-C range in conventional fashion. A bypass capacitor 51 is coupled in parallel relationship with resistor 50 and these elements 50, 51 connect base 41 to a frequency determining or tank circuit comprising a caapcitor 52 in parallel with a variable inductive reactance included in generator 28 for varying its operating frequency. The principal winding of this reactance has two series-connected sections 53, 54. The emitter 43 of transistor 40 is coupled to a tap provided on winding 54 thus effectively coupling a portion of coil 54 between emitter 43 and base 41. The winding sections 53 and 54 are respectively wound about first and second end legs of a permeable core 58 which has a central leg, providing along with the outer legs, a plurality of closed magnetic paths. A control winding 56 is wound about the central leg of the core and is coupled at one end to amplifier 27; its remaining end is coupled to the B—. This connection serves as a means for supplying the error signal amplifier 27 to control winding 57.

In considering the operation of the described automatic frequency control circuit, it will be assumed initially that the oscillations developed in horizontal generator 28 have the desired phase relation with respect to the horizontal synchronizing components of the received telecast. For these conditions, oscillation generator 40 develops a signal of substantially pulse waveform and of a frequency determined by its resonator circuit 52, 53. The oscillator not only energizes the horizontal deflection system of the receiver but also causes a comparison signal to be applied to phase detector 25 where it is compared with the horizontal synchronizing components of the received signal. For the assumed condition of phase synchronism, the output of detector 25 is zero and transistor amplifier 27 is conductive so that a predetermined or reference current flows in its output circuit including control winding 57 of the variable inductive reactance.

The current flow through control winding 57 results in two components of flux traversing the magnetic paths of core 58 as indicated by the arrows Q*c*. The presence of this flux determines the saturation and permeability of the core and the effective inductive reactance of the oscillator for the assumed operating condition.

If it now be assumed that the oscillations developed in generator 28 are not in the desired phase relation with the received synchronizing components, an error signal is developed in phase detector 25 in the usual fashion which reflects a change in the output current of amplifier 27. If the output current increases, its flux contributions Q*c* and the saturation of core 58 likewise increase which causes the apparent inductance of the variable inductive reactance to change in order to restore the proper phase relations of the locally generated oscillations by changing the operating frequency of oscillator 28.

Conversely, where the compared signals are out of phase in the opposite sense, the output current of amplifier 27 is decreased by the control imposed by the error signal of phase detector 25. This decreases the current in control winding 57 to vary the operating frequency of oscillator 28 in the opposite sense as required to restore the desired phase relations.

It is desirable, as explained above, that control winding 57 have a relatively large number of turns in order that a smaller driving current from phase detector 25 and amplifier 27 may accomplish a predetermined change in operating frequency of oscillator 28. As a practical matter, winding 57 has considerably more turns than either of sections 53, 54 of the principal winding of the inductive reactance. As a consequence, control winding 57 in conjunction with either of winding sections 53, 54 partakes of a step up transformer and the oscillation voltage traversing winding sections 53, 54 tends to induce a large oscillation voltage in the control winding. Unless obviated, this could result in damage to the driving amplifier 27 especially when it is of the transistor variety. To avoid that undesired result, winding sections 53, 54 have the same number of turns and are so wound on the legs of core 58 that the fluxes which they establish in the core, designated $QL_1$ and $QL_2$, oppose one another in central leg 57. When this winding relation is established, the oscillatory voltage induced by one of the winding sections 53, 54 in control winding 57 is cancelled by an opposing voltage of like magnitude which is concurrently induced in control winding 57 by the other of winding sections 53, 54. Thus no oscillator voltage is effectively developed in the control winding and its driving stage is thereby protected.

If desired, the control winding may be constructed of two sections respectively wound about the end legs of core 58 with the principal winding 53 wound about the center leg. The control winding sections may be arranged in such manner that oscillatory voltages developed therein, due to flux in core 58 attributable to winding 53, are effectively eliminated because they are in phase opposition to each other.

Thus, the invention provides a new and improved automatic frequency control circuit for use in a television receiver. The control circuit employs a variable inductor having control and output windings wound on separate legs of a common core. The apparatus eliminates component breakdown by preventing high-voltage feedback at the oscillator frequency from reaching the transistors employed in the preceding control-signal producing stages.

While a particular embodiment of the invention has been shown and described, it will be obvious to those skilled in the art that changes and modifications may be made without departing from the invention in its broader aspects. The aim in the appended claim, therefore, is to cover all such changes and modifications as fall within the true spirit and scope of the invention.

I claim:

An automatic frequency control circuit for use in a transistor television receiver comprising:

a source of reference signal;

a transistor generator for producing a local signal the phase of which may be varied;

means for comparing the phase of said reference signal and said local signal to produce an error signal varying in both directions from a reference value in proportion to the magnitude and direction of departure of said local signal from a predetermined phase relation with said reference signal;

a transistor error-signal translating stage coupled to said phase comparing means and subject to breakdown in the presence of high-voltage feedback signals from subsequent stages;

a variable inductive reactance, included in said generator for varying the frequency of said local signal bi-directionally about a predetermined frequency, comprising a permeable core having a center leg and two end legs with a control winding wound about said center leg and a principal two-section winding with one of said sections wound about each of said end legs to induce equal and opposite feedback voltages in said control winding;

and means coupled to said transistor error-signal translating stage for applying said error signal to said control winding to bi-directionally vary the saturation of said core and the apparent inductance of said inductive reactance to maintain said local signal at said predetermined frequency while preventing the application of high-voltage feedback signals and consequent damage to said error-signal translating stage.

References Cited in the file of this patent

UNITED STATES PATENTS 1,450,966 Affel ------------------ Apr. 10, 1923

OTHER REFERENCES

Article in Electronic Industries, February 1961, pages 116–120.